United States Patent [19]
Guimbretière

[11] Patent Number: 5,806,936
[45] Date of Patent: Sep. 15, 1998

[54] DRIVE-WHEEL HUB FOR A MOTOR VEHICLE

[75] Inventor: Pierre Louis Guimbretière, Neauphle-Le-Chateau, France

[73] Assignee: GKN Glaenzer Spicer, Carrieres-sous-Poissy, France

[21] Appl. No.: 710,649

[22] Filed: Sep. 18, 1996

[30] Foreign Application Priority Data

Sep. 18, 1995 [FR] France .................................. 95 10919

[51] Int. Cl.$^6$ .................................................. B60B 27/00
[52] U.S. Cl. ........................................ 301/105.1; 384/544
[58] Field of Search ............................ 301/105.1, 124.1, 301/125, 126, 131; 180/258, 259; 384/544; 464/178, 904, 906

[56] References Cited

U.S. PATENT DOCUMENTS

| 2,075,563 | 3/1937 | Alden | ........................................ 180/259 |
| 5,590,967 | 1/1997 | Kapaan | ........................................ 384/544 X |

FOREIGN PATENT DOCUMENTS

| 653 315 | 5/1995 | European Pat. Off. . | |
| 2 482 016 | 11/1981 | France . | |
| 2 527 717 | 12/1983 | France . | |
| 2 695 694 | 3/1994 | France . | |
| 1480793 | 5/1969 | Germany | .............................. 301/105.1 |
| 42 30 639 | 10/1993 | Germany . | |
| 2 097 734 | 11/1982 | United Kingdom . | |

*Primary Examiner*—Russell D. Stormer
*Attorney, Agent, or Firm*—Wenderoth, Lind & Ponack, L.L.P.

[57] ABSTRACT

A driven-wheel hub (18) includes an axial cavity (36) for the passage of the body of a bolt (16) for fixing a driving member (14) onto the hub. This member (14) is provided with a tapped hole (17) into which the threaded end (16A) of the bolt body is screwed. The cavity (36) has a diameter which is very much larger than the diameter of the bolt body and is bordered at its rear end by a bearing surface (40) for the head (45) of the bolt. The hub (18) furthermore includes a way of ensuring that it rotates as one with the driving member. A guide for guiding the bolt (37) are provided in the cavity (36) between the said bearing surface (40) and the entry to the tapped hole (15). The guides (38) are spaced away from the said bearing surface (40) along the axis of the hub.

21 Claims, 3 Drawing Sheets

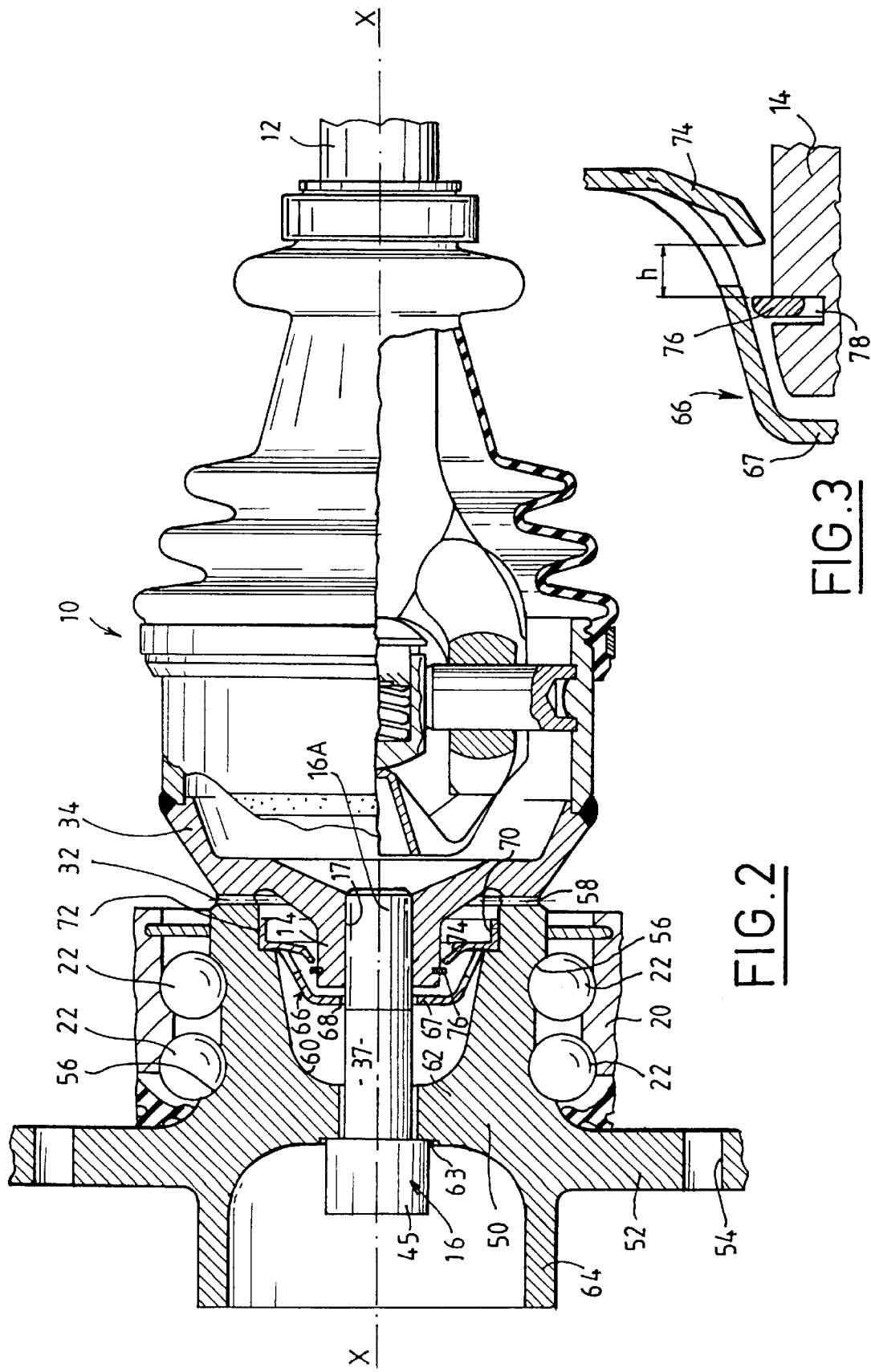

DRIVE-WHEEL HUB FOR A MOTOR VEHICLE

BACKGROUND OF THE INVENTION

The present invention relates to a driven-wheel hub for a motor vehicle, of the type including an axial through-cavity intended for the passage of the body of a bolt for fixing a driving member onto the said hub. This member has a tapped hole into which the threaded end of the bolt body is screwed. The cavity has a diameter which is very much larger than the diameter of the body and is bordered at its rear end by a bearing surface for the head of the bolt. The hub furthermore includes means for ensuring that it rotates as one with the driving member.

For mounting a driving wheel on a motor vehicle, it is known practice to use a hub which is mounted so that it can rotate with the aid of a set of rolling bearings in a hub carrier incorporated into the suspension, or even steering, systems. The hub also contains means for attaching the wheel, for example a flange and tapped holes designed to take fixing bolts.

An axial cavity passes right through the hub. The end of the driving member is partially received at the front of this cavity, that is to say on the inboard side of the vehicle. This driving member is, for example, a driving stub axle formed by the output shaft of a universal joint. At its rear end, that is to say on the outboard side of the vehicle, the through-cavity of the hub is bordered by a bearing surface for the head of an attaching bolt, which is engaged through the hub and the threaded end of which is received in a tapped hole formed in the end of the driving member. The hub and the driving member bear complementary means, such as splines, to ensure that they rotate as one.

In order to reduce the weight of the hub, the axial cavity has an inside diameter which is very much larger than the diameter of the bolt body. What is more, in order to allow simple removal, with a view to and changing the transmission, or for work on the hub, the end of the driving member interacting with the axial cavity of the hub has a short or even a practically negligible length. The bolt body passing through the cavity is therefore in the form of a very long rod, and this is actually desirable in order to obtain the greatest possible reserve of elasticity.

The fitting of the bolt is made very haphazard in these conditions. In particular, the placement of the bolt is not at all compatible with production line assembly of the driveline components.

SUMMARY OF THE INVENTION

The object of the present invention is to provide a hub making it easier to fit the bolt for fixing the driving member to the hub, while at the same time limiting the weight of the hub and without the need to lengthen the end of the driving member, perhaps even allowing it to be shortened.

To this end, the subject of the invention is a driving-wheel hub for a motor vehicle, of the aforementioned type, which includes, within the cavity, between the bearing surface and the entry to the tapped hole, a means for guiding the bolt. These guide means are spaced away from the bearing surface along the axis of the hub.

According to particular embodiments, the hub may exhibit one or more of the following features:

The guide means can be provided in the front half of the portion of the cavity delimited at the rear by the bearing surface and at the front, in service, by the entry to the tapped hole, and especially in close proximity to the entry to the tapped hole. The guide means can be designed to guide the threaded end of the bolt body until it penetrates the entry to the tapped hole. The guide means include means for restricting the cross section of the cavity.

The restricting means include a flange formed integrally with the hub and extending transversely inside the cavity. The restricting means include an attached ring engaged transversely inside the cavity. The means for ensuring rotation as one include splines formed on the hub and interacting with complementary splines of the driving member. The splines are frontal splines arranged radially in a ring centered on the axis of the hub on an end face thereof situated facing a complementary splined ring of the driving member. The splines are produced longitudinally on at least part of the axial cavity. Close to the means for guiding the bolt, the hub includes retaining means for holding the hub on the driving member in the event of loosening of or damage to the bolt. The retaining means include stops integral with the hub and arranged around an extension of the driving member. The said stops interact with an external annular projection borne by the driving member behind the stops. The stops are radial legs cut from the ring and pushed back towards the tapped hole. In the assembled position, the distance separating the annular projection from the stops is greater than the height of the frontal splines which means that when the annular projection is in contact with the stops, the splines are disengaged from the complementary splines of the driving member.

The hub incorporates at least one inner race of the roller bearing for mounting in a hub carrier.

BRIEF DESCRIPTION OF THE DRAWINGS

The invention will be better understood from reading the description which will follow, given merely by way of example and made with reference to the drawings, in which:

FIG. 2 is a view in longitudinal part section of the end of a driveline associated with a driving wheel and including a hub with frontal splines according to another alternative form;

FIG. 3 is a view in section on a larger scale of a detail of FIG. 2; and

DETAILED DESCRIPTION OF THE PREFERRED EMBODIMENTS

Figure 1A:
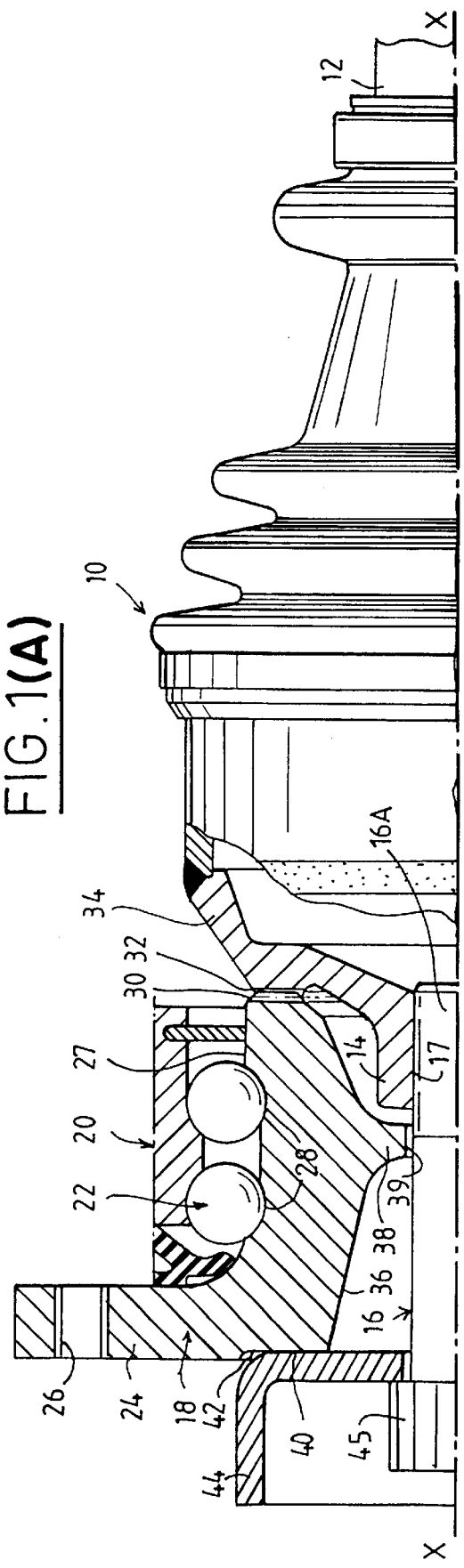
FIG. 1A and 1B are views in longitudinal part section of the end of a driveline associated with a driving wheel of a motor vehicle and including a hub with frontal splines according to the invention, represented in seperate halves in FIGS. 1A and 1B according to two alternative forms.
Figure 1B:
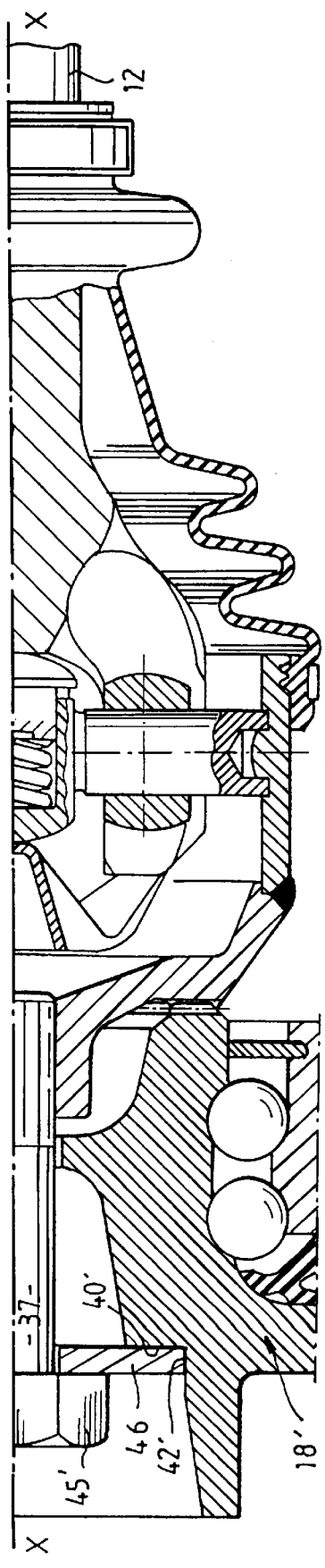

In FIG. 1, the end part of the driveline represented has an overall axis X—X in the aligned position, and includes a constant-velocity joint 10 which cannot move axially, an input shaft 12 of which is assumed to receive its movement from a motive power unit, and an output shaft of which consists of a bell housing 34 extended by a stub shaft 14 which includes a tapped hole 17. A bolt 16, a threaded end 16A of which is received in the tapped hole 17, presses the bell housing 34 onto a hub for supporting a driving wheel, not represented. FIGS. 1A and 1B, two alternative forms of the hub are represented on opposite sides of their respective axis X—X, and are denoted by the references 18 and 18'. The hubs 18, 18' are mounted so that they can rotate in a wheel hub carrier by means of a double-row ball bearing, a single outer race 20 of which has been partially represented in FIG. 1A.

The hub 18 has the overall shape of a sleeve which has symmetry of revolution about the axis X—X. At its rear end, that is to say the opposite end to the tripod joint 10, it externally includes an annular flange 24 provided with tapped holes 26 for receiving the bolts for attaching the wheel (bolts not represented). Since the inner race or races of the rolling bearing are formed integrally with the hub, the latter furthermore has, on a cylindrical surface 27, two peripheral grooves 28 of rounded cross section forming raceways and thrust surfaces for balls 22. On its front end face, the hub 18 includes frontal splines 30 designed to interact with complementary splines 32 formed on the outer wall of the bell housing 34 of the joint 10. The splines 30 thus extend radially about the axis X—X and form a splined ring stretching perpendicular to this axis and centered on it.

The hub 18 is axially provided with an axial through-cavity 36 for the passage of the shank or body 37 of the bolt 16. This cavity 36 generally has a diameter which is very much larger than a diameter of the bolt body or shank 37. A flange 38 for guiding the bolt body 37 extends inwards at roughly the front third of this cavity. This flange is formed integrally with the hub 18 and delimits an axial passage 39 for the bolt body. The inside diameter of this passage 39 is very slightly larger than that of the bolt body 37. The front portion of the cavity thus delimits a recess, flared outwards, for accommodating the stub shaft 14, the bottom of this recess being formed by the flange 38.

The rear end of the cavity 36 is bordered by an annular bearing surface 40. This surface is formed by the bottom of a spot face 42 on which a cup 44 bears. The bottom of this cup has an outside diameter smaller than that of the spot face 42 and is pierced to allow the bolt shank 37 to pass through with a small clearance.

To mount such an assembly, the hub 18 is first of all put in place in the hub carrier by in-situ assembly of the double-row ball bearing.

The bolt 16, the length of which is slightly greater than the length of the cavity 36, is introduced through the hole in the cup 44 then through the cavity 36. During this introduction, the threaded end 16A of the bolt is guided by the flange 38, and then the bolt body is held laterally by this flange until the stub shaft 14 is put in place. The latter is then arranged at the front end of the cavity 36 along the axis X—X, something which is made possible by the fact that this stub shaft is short. The bolt 16 is then screwed into the tapped hole 17 of the stub shaft 14, which brings the bell housing 34 and the hub 18 closer together. On completion of screwing, the splines 30 and 32 interact and ensure that the hub 18 and the joint 10 will rotate as one. Furthermore, the head 45 of the bolt 16 bears on the surface 40 via the bottom of the cup 44.

It will be understood that with such an arrangement, despite the long length of the bolt 16 and the fact that the view is obstructed, it is easy to screw the end of the bolt 16 into the tapped hole 17. This is because the flange 38 gives the bolt body sufficient angular and lateral positioning and guidance inside the cavity 36 to allow this bolt to be introduced easily into the tapped hole 17.

Furthermore, the width and thickness of the bottom of the cup 44 allow the bolt head 45 to bear indirectly on the bearing surface 40 and thus angularly and laterally position the bolt 16, the end of which is received in the tapped hole 17. It is therefore unnecessary to provide additional guidance of the bolt in the region of its head.

In the alternative form represented below the axis X—X in FIG. 1B, the cup 44 is replaced by a washer 46 pressed onto a flat bearing surface 40' bordering the opening 36 at its rear end. In this embodiment, the washer 46 is guided precisely at its periphery by the internal lateral surface of the spot face 42'. In this way, this washer provides the bolt 16 with guidance immediately forward of its head 45'.

FIG. 2 represents an alternative form of the invention. The elements which are similar to those in FIG. 1 bear the same references in this figure and in the remainder of the description.

In this figure, the hub 18 is replaced by a hub 50, having the overall form of a sleeve tube of axis X—X and including, as before, on its outside wall, a peripheral flange 52 provided with tapped holes 54 for receiving bolts for attaching the wheel. Likewise, raceways 56 are provided for the balls 22, as are frontal splines 58 designed to interact with the splines 32 of the bell housing 34. As before, the hub 50 has an axial cavity 60 passing right through it. This cavity generally has an inside diameter which is very much larger than the diameter of the bolt body 37, and flares progressively towards its front end.

At the rear end of the cavity 60, an internal peripheral flange 62 formed integrally with the hub 50 delimits a bolt passage with a diameter slightly larger than the diameter of the bolt body 37. This flange carries a rear bearing surface 63 for the bolt head 45. The hub 50 is extended at its rear part by a spigot 64 for guiding the wheel of the vehicle, the spigot being formed integrally with the hub 50.

A ring 66 for guiding the bolt body 37 is attached transversely inside the cavity 60. It is formed of pressed sheet metal and has the overall shape of a bell, a flattened bottom 67 is pierced with an axial passage 68. The diameter of this passage 68 is slightly larger than the diameter of the bolt body 37. The curved lateral wall of the ring 66 is extended by a collar 70 for fixing into a counterbore 72 formed at the front end of the cavity 60. The bell-shaped ring 66 extends inside the cavity 60 in such a way that it flares out towards the front end thereof.

Moreover, the ring 66 has four radial legs or tabs 74 cut directly from the curved lateral wall and pushed back forwards in order to form stops for holding the stub shaft 14 on the hub 50. These legs 74 are elastic and connected to the ring 66 at their end furthest from the axis X—X.

As represented in detail in FIG. 3, the stub shaft 14 carries a circlip 76 housed in a groove 78 formed close to the end of the stub shaft. The groove 78 is positioned in such a way that in the assembled position, corresponding to FIGS. 2 and 3, the circlip 76 is between the bottom 67 and the legs 74 of the ring 66 and so that the distance h separating the circlip 76 from the free stop end of the legs 74 is slightly greater than the height of the splines 58. The bottom 67 of the ring 66 is arranged immediately in front of the entry to the hole 17.

In order to assemble the assembly represented in FIGS. 2 and 3, the ring 66 is fitted into the cavity 60, and then the hub 50 is put in place in the hub carrier. The stub shaft 14 fitted with the circlip 76 is then introduced into the cavity 60. The circlip 76 is positioned between the bottom 67 and the legs 74 by elastic deformation of the latter. The bolt 16 is then inserted into the opening 60 and is screwed into the tapped hole 17. As before, its placement is made easier by the guidance provided by the passage 68 delimited by the ring 66.

In this embodiment, in the event of the bolt 16 accidentally becoming unscrewed, or breakage of this bolt while the vehicle is travelling, the hub 50 no longer rotates as one with the bell housing 34 because the distance h separating the circlip 76 from the stop end of the legs 74 is slightly greater than the height of the splines 58. The hub is therefore no longer driven by the bell housing 34, and the vehicle automatically comes to a standstill, but the annular projection formed by the circlip 76 held between the bottom 67 and the legs 74 prevents the driveline from dropping down.

Such an arrangement, in addition to making it easier to fit the bolt 16, improves the safety of the vehicle by preventing a driveline from dropping down in the event of unscrewing or breakage of the bolt.

Figure 4:
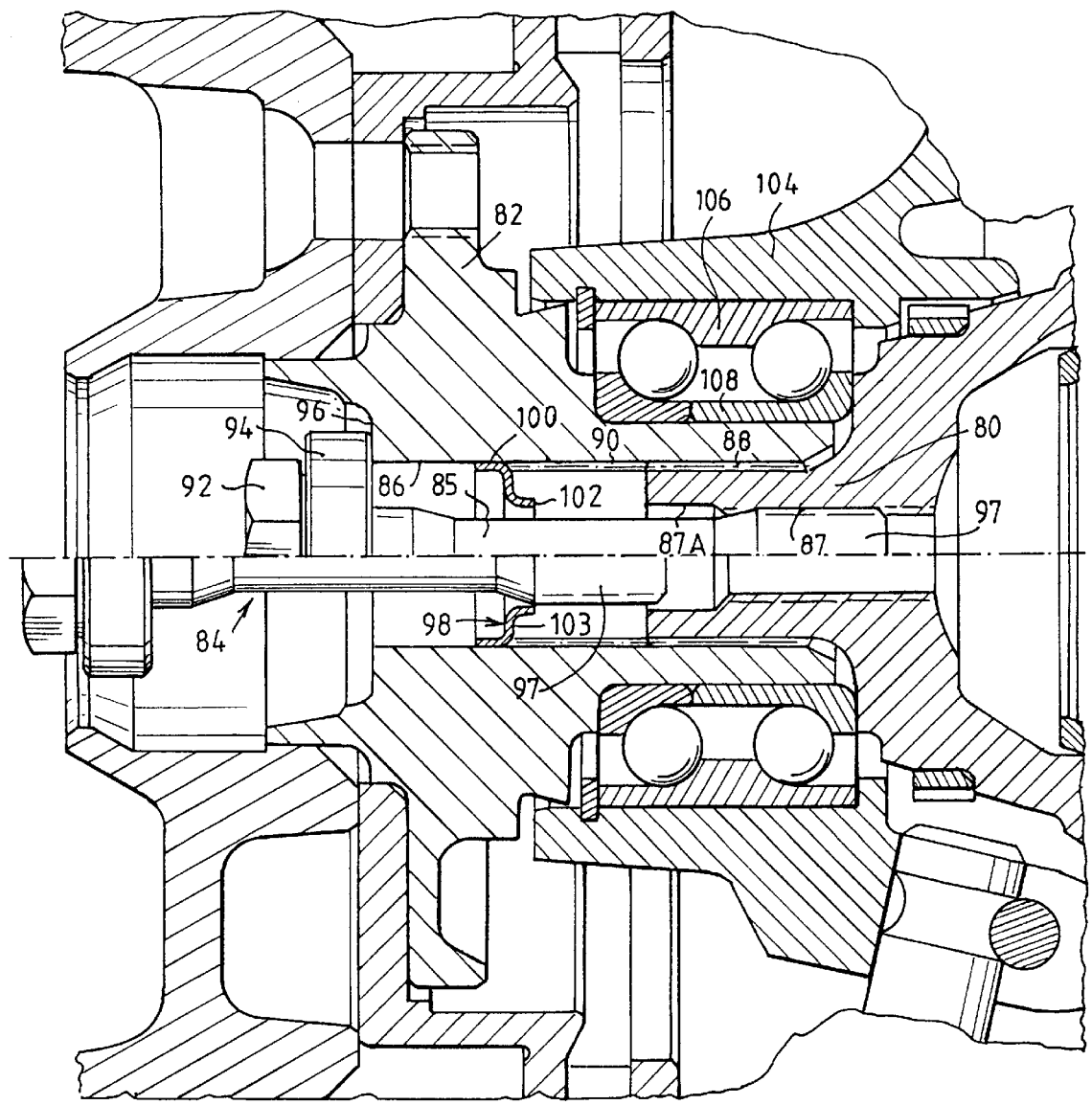
FIG. 4 is a view in longitudinal section of the end of a driveline associated with a driving wheel of a motor vehicle and including a hub with longitudinal splines according to the invention, a bolt being represented in two different positions.

In the alternative form represented in FIG. 4, the output shaft of the driving member forms a wheel stub axle 80 secured to a hub 82 by means of a fixing bolt 84. The bolt 84, thinned down at 85 in its middle part, is introduced into an axial through-cavity 86 of the hub, and the threaded end is received in a tapped hole 87 in the stub axle 80. The thinned-down portion 85 increases the reserve of elasticity of the bolt. A counterbored entry portion 87A to this hole forms a definitive guide for the screwing engagement of the bolt. Longitudinal splines 88 are formed on the end of the driving stub axle 80 received inside the cavity 86. Complementary longitudinal splines 90 are provided on the lateral wall of the cavity 86 to ensure that the hub 82 and the stub axle 80 can rotate as one.

In this embodiment, a head 92 of the bolt 84 bears via a thick washer 94, on the bottom of a spot face 96 formed on the rear periphery of the cavity 86. A ring 98 push-fitted transversely in the cavity 86 provides the guidance for threaded end part 97 of the bolt when the latter is being introduced (lower half of FIG. 4). This ring is arranged roughly midway along a portion of the cavity delimited at the rear by the bearing surface 96 for the bolt head 92 and at the front by the entry to the tapped hole 87. More specifically, the ring 98 bears on the rear end of the splines 90.

Furthermore, the ring 98 has successive concentric annular portions, of which a first portion 100, in the form of a collar, is in contact with the lateral wall of the duct 86 and a second portion 102 delimits a guide passage for the threaded end 97 of the bolt. These two portions are connected by a frustoconical annular wall 103 which converges towards the front of the duct 86.

In this embodiment, in order to allow the hub 82 to rotate in a hub carrier 104, a twin-row ball bearing 106 is push-fitted onto the outer lateral wall of the hub 82 and in a bore of the hub carrier. The split inner race 108 of this ball bearing is fitted in between two opposing frontal faces of the hub 82 and of the driving stub axle 80, respectively. It is compressed between these two members under the effect of the bolt 84. This double race 108 provides relative axial positioning of the hub 82 with respect to the hub carrier 104.

In this embodiment, for assembly, the hub 82 is introduced into the ball bearing 106, already put in place in the hub carrier 104, and then the male splines 88 of the stub axle 80 are introduced into the female splines 90. The bolt 84 is then inserted into the cavity 86, and its threaded end 97 is guided by the ring 98 as far as the entry 87A of the tapped hole 87, into which it is then screwed (upper half of FIG. 4).

In the embodiments of FIGS. 1 and 4, the bolt head bears respectively on the bottom of a cup 44 and on a washer 94. However, the bolt head may, as in the embodiment of FIG. 2, bear on an internal flange provided at the rear end of the opening in the hub and formed integrally with the hub.

I claim:

1. A driven wheel hub for a motor vehicle intended to be attached by a bolt to a driving member having a tapped hole having an entry point, said driven wheel hub comprising:
   a hub body having an outboard side, an inboard side, and an axial cavity extending through said hub body;
   a bearing surface on said outboard side of said hub body for bearing a head of the bolt, wherein said axial cavity at has a portion delimited at said outboard side by said bearing surface and at said inboard side, when said hub body is to be connected to the driving member, by the entry point to the tapped hole of the driving member, said portion of said axial cavity having a front half on said inboard side and a rear half adjacent to said bearing surface;
   means on said hub body for ensuring that said hub body rotates together with the driving member when the driving member is attached to said hub body;
   guide means within said axial cavity of said hub body, between said bearing surface and the location of the entry point of the tapped hole when the driving member is to be connected to said hub body for guiding the bolt, said guide means being located in said front half of said portion of said axial cavity.

2. The driven wheel hub of claim 1, wherein said guide means is in close proximity to the entry point of the tapped hole when the driving member is attached to said hub body.

3. The driven wheel hub of claim 1, wherein said guide means is further for guiding a threaded end of the bolt body until the threaded end penetrates the entry point to the tapped hole when the driving member is attached to said hub body.

4. The driven wheel hub of claim 1, wherein said guide means comprises means for reducing the cross section of said axial cavity.

5. The driven wheel hub of claim 4, wherein said means for reducing the cross section of said axial cavity comprises a flange that is integral with said hub body and extends transverse to said axial cavity.

6. The driven wheel hub of claim 4, wherein said means for reducing the cross section of said axial cavity comprises a ring attached to said hub body and extending transverse to said axial cavity.

7. The driven wheel hub of claim 1, wherein said means on said hub body for ensuring that said hub rotates together with said driving member comprises splines on said hub body, complementary splines on the driving member interacting with said splines on said hub body when the driving member is attached to said hub body.

8. The driven wheel hub of claim 7, wherein said hub body has an axis, said splines of said hub body are radially arranged frontal splines centered with respect to said axis of said hub body and disposed on an end face of said hub body.

9. The driven wheel hub of claim 7, wherein said splines on said hub body extend longitudinally along a part of said axial cavity.

10. The driven wheel hub arrangement of claim 1, and further comprising retaining means for retaining said hub body on the driving member in the event of loosening of or damage to bolt when the driving member is attached to said hub body by the bolt.

11. The driven wheel hub arrangement of claim 10, wherein said retaining means comprises stops that are integral with said hub and that are disposed so as to be arranged around the driving member when the driving member is attached, the driving member carrying an external annular projection with which said stops can interact, the external annular projection being located between said stops and said outboard side of said hub body when the driving member is attached to said hub body.

12. The driven wheel hub arrangement of claim 11, wherein said guide means comprises means for reducing the cross section of said axial cavity, wherein said means for reducing the cross section of said axial cavity comprises a ring attached to said hub body and extending transverse to said axial cavity, and wherein said stops comprise radial legs that have been cut from said ring and pushed in the direction of the tapped hole.

13. The driven wheel hub arrangement of claim 12, wherein said hub body has an axis, said splines of said hub body are radially arranged frontal splines centered with respect to said axis of said hub body and disposed on an end face of said hub body, said end face facing complementary splines of a splined ring of the driving member when the driving member is attached to said hub body, and wherein when the driving member is assembled with said hub body, the distance separating the annular projection thereof from said stops is greater than the height of said frontal splines, whereby when the annular projection is in contact with said stops, said frontal splines are disengaged from complementary splines of the driving member.

14. The driven wheel hub arrangement hub arrangement of claim 1, wherein said hub body has an axis, said splines of said hub body are radially arranged frontal splines centered with respect to said axis of said hub body and disposed on an end face of said hub body, said end face facing complementary splines of a splined ring of the driving member, and wherein when the driving member is assembled with said hub body, the distance separating the annular projection thereof from said stops is greater than the height of said frontal splines, whereby when the annular projection is in contact with said stops, said frontal splines are disengaged from complementary splines of the driving member.

15. The driven wheel hub arrangement of claim 1, wherein said hub body has at least one inner race of a rolling bearing thereon adapted to mount said hub body in a hub carrier.

16. A driven wheel hub arrangement comprising:
   a hub body having an axis of rotation and an axial cavity extending through said hub body from an inboard side of said hub body to an outboard side of said hub body, said hub body being intended to be connected to a driving member with a bolt;
   a bolt bearing surface defined on said outboard side of said hub body, said bolt bearing surface being intended to receive the head of a bolt when the bolt connects said hub body to the driving member, said axial cavity extending from said bolt bearing surface to said inboard side of said hub body;
   a driving member rotation connection formed on said hub body and adapted to connect said hub body with the driving member in rotation when the driving member is connected to said hub body with the bolt;
   said hub body having a bolt guide in said axial cavity, said bolt guide being spaced from said bolt bearing surface in the direction of said inboard side of said hub body when the bolt connects the driving member to the hub body such that said driving member rotation connection connects with the driving member, and said bolt guide is spaced from an outboard end of the driving member in the outboard direction;
   wherein said bolt guide has an inner diameter that is smaller than the inner diameter of said axial cavity along a portion between said bolt bearing surface and said bolt guide.

17. The driven wheel hub arrangement of claim 16, wherein said bolt guide separates said axial cavity into an inboard portion for receiving the driving member and an outboard portion, said inner diameter of said bolt guide being smaller than the inner diameter of both said outboard portion and said inboard portion.

18. The driven wheel hub arrangement of claim 16, wherein said bolt bearing surface is formed directly on said hub body and surrounds an end of said axial cavity, said axial cavity extending from said bolt bearing surface.

19. The driven wheel hub arrangement of claim 18, wherein said bolt guide comprises an annular member inserted into said axial cavity.

20. The driven wheel hub arrangement of claim 16, wherein said bolt bearing surface is formed by a separate member on an outboard end of said hub body, said axial cavity increasing in internal diameter from said bolt bearing surface.

21. The driven wheel hub arrangement of claim 20, wherein said bolt guide is unitary with said hub body.

* * * * *